(12) United States Patent
Tsirkin

(10) Patent No.: US 9,830,287 B2
(45) Date of Patent: Nov. 28, 2017

(54) DETERMINATION OF A DEVICE FUNCTION ASSERTING A DETECTED SPURIOUS INTERRUPT

(71) Applicant: Red Hat Israel, Ltd., Ra'anana (IL)

(72) Inventor: Michael Tsirkin, Ra'anana (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 277 days.

(21) Appl. No.: 14/630,575

(22) Filed: Feb. 24, 2015

(65) Prior Publication Data

US 2016/0246739 A1     Aug. 25, 2016

(51) Int. Cl.
  *G06F 13/24* (2006.01)
  *G06F 13/32* (2006.01)
  *G06F 13/42* (2006.01)

(52) U.S. Cl.
  CPC .......... *G06F 13/24* (2013.01); *G06F 13/4221* (2013.01)

(58) Field of Classification Search
  None
  See application file for complete search history.

(56) References Cited

U.S. PATENT DOCUMENTS

| | | | |
|---|---|---|---|
| 4,521,884 A * | 6/1985 | Dix | G06F 11/0727 714/25 |
| 6,032,271 A | 2/2000 | Goodrum et al. | |
| 6,115,775 A | 9/2000 | Ross et al. | |
| 6,356,963 B1 * | 3/2002 | Maguire | G06F 9/4812 709/220 |
| 6,971,048 B1 | 11/2005 | Hanson et al. | |
| 8,434,098 B2 | 4/2013 | Lee et al. | |
| 8,631,181 B2 | 1/2014 | Feehrer et al. | |
| 8,868,810 B2 | 10/2014 | Gomes | |

OTHER PUBLICATIONS

"Intr (D2mdi) intr-process an MDI device interrupt", UnixWare 7 and SCO OpenServer, Sep. 29, 2004, 2 pages, The SCO Group, Inc. http://uw714doc.sco.com/en/man/html.D2mdi/intr.D2mdi.html.
"Stuck Interrupts", ChorusOS 5.0 Board Support Package Developer's Guide, 2010, 4 pages, Oracle Corporation and or/its affiliates. http://docs.oracle.com/cd/E19048-01/chorus5/806-6895/6jfqb3shd/index.html.
Nei et al., "8240 and Spurious Interrupts", www.programD.com, May 31, 2001, 3 pages. http://www.programd.com/126_8298d983cb01687a_1.htm on Jan. 27, 2015.
(Continued)

*Primary Examiner* — Idriss N Alrobaye
*Assistant Examiner* — Richard B Franklin
(74) *Attorney, Agent, or Firm* — Haynes and Boone, LLP

(57) ABSTRACT

Systems and methods are provided for detection of device functions asserting a spurious interrupt. An example method includes detecting, by a central processing unit executing an operating system, a spurious hardware interrupt signal from a device function, wherein a plurality of device functions include the device function, determining an Interrupt Request (IRQ) value from the spurious hardware interrupt signal, wherein the plurality of device functions share the IRQ value, and scanning each of the plurality of device functions to determine the device function generated the spurious hardware interrupt signal.

20 Claims, 4 Drawing Sheets

(56) References Cited

OTHER PUBLICATIONS

Jonathan Corbet, "Improving Lost and Spurious IRQ Handling", Jun. 15, 2010, 3 pages, Eklektix, Inc. http://lwn.net/Articles/392136/.
Azeem Khan, "[E1000-Devel] help understand origin of spurious interrupts", Intel Ethernet Drivers and Utilities (/p/e/1000/), Apr. 17, 2009, 7 pages, SourceForge. http://sourceforge.net/p/e1000/mailman/message/22125960/.
Red Hat Enterprise Linux 6, "Bug 925170-MSI routing for 1553 card to guest stops working" Mar. 22, 2013, 15 pages. https://bugzilla.redhat.com/show_bug.cgi?id=925170.

\* cited by examiner

DETERMINATION OF A DEVICE FUNCTION ASSERTING A DETECTED SPURIOUS INTERRUPT

FIELD OF DISCLOSURE

The present disclosure generally relates to a computer system and more particularly to detection of spurious interrupt signals from PCI device functions and determination of the PCI device function asserting the spurious interrupt signal.

BACKGROUND

A computer system may include attached devices that may require time to interact with a central processing unit (CPU) of the computer system, for example, to complete some processing task. In certain systems, the CPU has been able to interact with attached devices using polling, whereby each device is given a preset amount of time to interact with the CPU regardless of whether the attached device required interaction with the CPU and processing time. Other computing systems may include attached devices that utilize interrupt signals to cause an operating system of the computing system (e.g., executed by the CPU) to pause the current code and process an event from one of the attached devices that requires attention. The interrupt signal may be initiated by a function of the attached device, for example, when the attached device is required to complete an activity. The operating system may then initiate an interrupt handler, which may be included with a driver of the attached device. The interrupt handler may then attempt to deal with the device function requiring attention. For example, an interrupt may be generated when a key is pressed on a keyboard or when a mouse is moved, which are then processed by the CPU using an interrupt handler for a driver of the keyboard/mouse. However, not all interrupt signals are desirable, and a spurious interrupt signal may be generated by an unwanted hardware condition, such as a device or driver error or other faulty status.

In order to assert an interrupt signal, the attached devices of a computing system may utilize an Interrupt Request (IRQ) value for an interrupt line connected to the CPU through a Programmable Interrupt Controller (PIC). The PIC allows for multiple devices connected to the computer system to each interrupt the CPU using the PIC. The PIC further utilizes interrupt wires to each of the connected devices that include their own IRQ value. The IRQ value allows the CPU to identify the attached device that requested the interrupt. Peripheral Component Interconnect (PCI) devices connected to a computer system may share IRQ values so that multiple PCI device functions may utilize the IRQ value when generating an interrupt signal. Since each IRQ value allows for the CPU to identify the device or devices generating the interrupt signal, PCI devices sharing an IRQ value may utilize the interrupt handler of the PCI device to access the PCI device function and deassert the interrupt so that the IRQ value may be utilized by other PCI devices sharing the IRQ value. However, a spurious interrupt signal that is unexpected by the driver and cannot be deasserted by the interrupt handler may stay asserted forever if the cause of the spurious interrupt signal is not resolved. Thus, the spurious interrupt signal may lock the IRQ value from the other device functions sharing the IRQ value.

BRIEF SUMMARY

This disclosure relates to computing systems and methods for detection of device functions asserting a spurious interrupt. Methods, systems, and techniques for determination of a device function asserting a detected spurious interrupt are provided.

According to an embodiment, a system for determination of a device function asserting a detected spurious interrupt includes detecting, by a central processing unit executing an operating system, a spurious hardware interrupt signal from a device function, wherein a plurality of device functions include the device function, determining an Interrupt Request (IRQ) value from the spurious hardware interrupt signal, wherein the plurality of device functions share the IRQ value, and scanning each of the plurality of device functions to determine the device function generated the spurious hardware interrupt signal.

According to another embodiment, a method for determination of a device function asserting a detected spurious interrupt includes a device operating system module executed by at least one hardware processor that processes at least one device driver module having an interrupt handler, and a spurious interrupt detection module that detects a spurious hardware interrupt signal from a device function, wherein a plurality of device functions comprise the device, determines an Interrupt Request (IRQ) value from the spurious hardware interrupt signal, wherein the plurality of device functions share the IRQ value, and scans each of the plurality of device functions to determine the device function generated the spurious hardware interrupt signal.

According to another embodiment, a non-transitory computer readable medium comprising a plurality of machine-readable instructions which when executed by one or more processors of a server are adapted to cause the server to perform a method for determination of a device function asserting a detected spurious interrupt including receiving an input source code including detecting, by a central processing unit executing an operating system, a spurious hardware interrupt signal from a device function, wherein a plurality of device functions include the device function, determining an Interrupt Request (IRQ) value from the spurious hardware interrupt signal, wherein the plurality of device functions share the IRQ value, reading a PCI status register for the PCI bus to determine an interrupt status bit for the PCI device, and testing the interrupt status bit for the PCI device function to determine whether the PCI device function generated the spurious hardware interrupt signal. The method further includes, in response to determining the PCI device function generated the spurious hardware interrupt signal, utilizing an interrupt handler for a driver of the PCI device function to determine whether the PCI device function is generating the spurious hardware interrupt signal, wherein the PCI device function is generating the spurious hardware interrupt signal if the interrupt handler does not detect device function activity for the PCI device function or detects that the spurious hardware interrupt signal is not cleared for the PCI device, and wherein the PCI device function is not generating the spurious hardware interrupt signal if the interrupt handler detects device function activity for the PCI device function or detects that the driver handles the spurious hardware interrupt signal, increasing a first spurious interrupt counter if the PCI device function is generating the spurious hardware interrupt signal, and clearing the first spurious interrupt counter if the PCI device function is not generating the spurious hardware interrupt signal.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Figure 1:
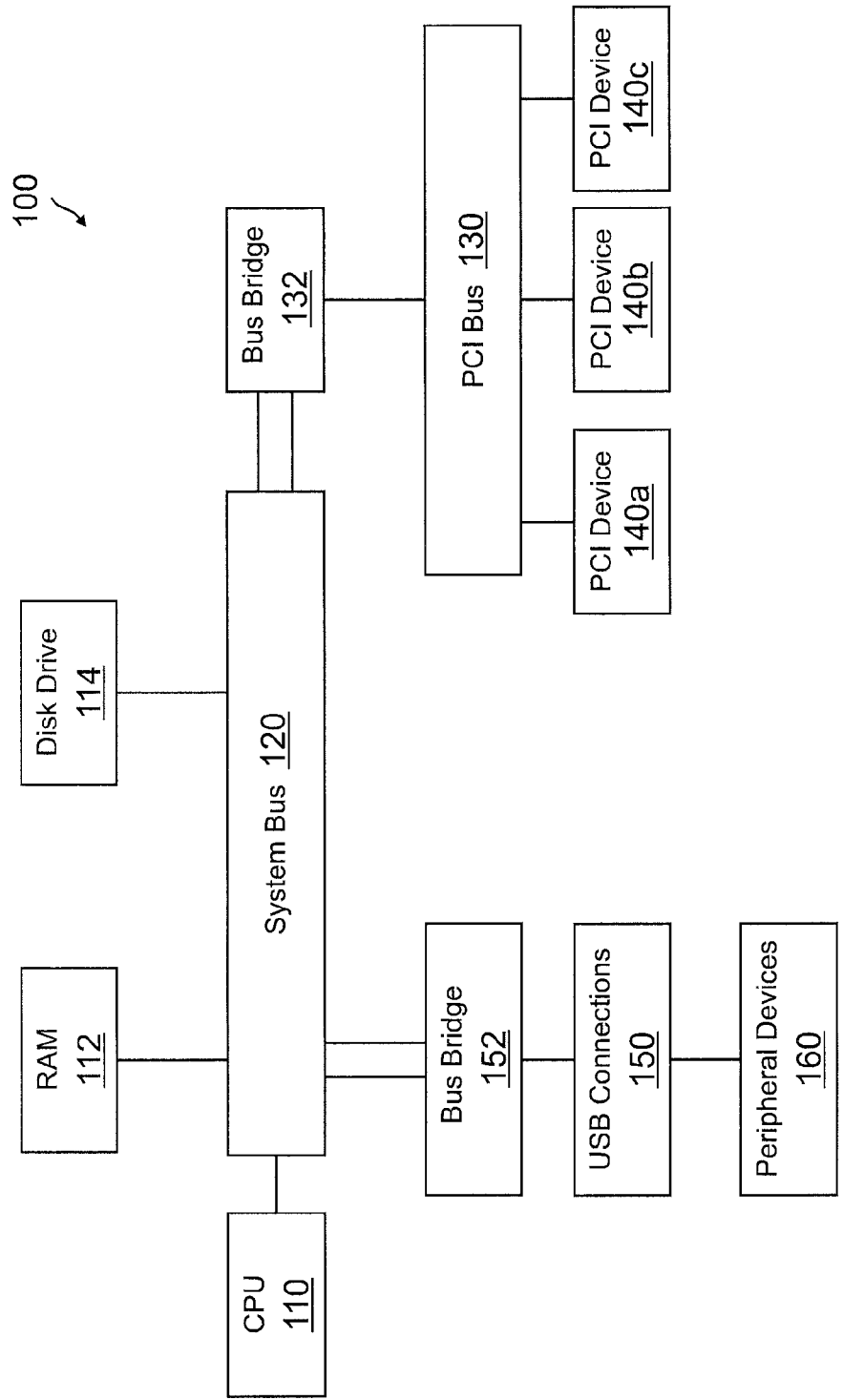
FIG. 1 illustrates a computer system suitable for implementing an embodiment for detection of device functions asserting a spurious interrupt, according to an embodiment.

FIG. 1 illustrates a computer system suitable for implementing an embodiment for detection of device functions asserting a spurious interrupt, according to an embodiment. Terms like "machine," "device," "computer," and "computing system" are used interchangeably and synonymously throughout this document.

System 100 may correspond to a client computing system, which may handle spurious interrupt signals from one or more PCI hardware device functions through the embodiments discussed herein. In this regard, system 100 of FIG. 1 includes a central processing unit (CPU) 110, a volatile Random-Access Memory (RAM) 112, a non-volatile disk drive memory 114, a system bus 120, a Peripheral Component Interconnect (PCI) bus 130, a PCI device 140a, a PCI device 140b, and a PCI device 140c, a Universal Serial Bus (USB) 150, and peripheral devices 160. In other embodiments, system 100 may include additional or different components, devices, or connectors as necessary. In various embodiments, system 100 may comprise a personal computing device (e.g., smart phone, a computing tablet, a personal computer, laptop, PDA, Bluetooth device, key FOB, badge, etc.) capable of communicating with the network. It should be appreciated that each of the devices utilized by users may be implemented as system 100 in a manner as follows.

One or more processors may be embodied as CPU 110, which can be a micro-processor, digital signal processor (DSP), or other processing component. CPU 110 may process various received data and may carry out the code or instructions of one or more computer programs, for example, to provide input/output operations specified by the code. CPU 110 may execute an operating system program, as well as sub-programs and/or applications of the operating system to provide various features and embodiments described herein. In this regard, CPU 110 may receive data for processing from system bus 120 and output data to system bus 120 for display to a user of system 100. Thus, system 100 further includes system bus 120 or other communication mechanism for communicating information data, signals, and information between various components of system 100. System bus 120 may be utilized to connect to one or more attached devices or other components. System bus 120 may transfer data between components inside the system 100 utilizing one or more connections, such as parallel and bit serial connections.

System bus 120 may be connected to RAM 112 and disk drive 114 in order to effectuate communication of stored data to CPU 110 and further storage of data output by CPU 110. Components of system 100 also include a system memory component (e.g., RAM 112) and/or a disk drive 114. In various embodiments, system 120 may further include a static storage component (e.g., Read-Only Memory (ROM)). System 100 performs specific operations by CPU 110 and other components by executing one or more sequences of instructions contained in RAM 112. Logic may be encoded in a computer readable medium, which may refer to any medium that participates in providing instructions to CPU 110 for execution. Such a medium may take many forms, including but not limited to, non-volatile media, volatile media, and transmission media. In various embodiments, non-volatile media may include optical or magnetic disks, such as disk drive 114 and/or ROM, while volatile media may include dynamic memory, such as RAM 112. Moreover, transmission media may include coaxial cables, copper wire, and fiber optics, including wires that comprise system bus 120. In one example, transmission media may take the form of acoustic or light waves, such as those generated during radio wave, optical, and infrared data communications. In certain embodiments, the logic is encoded in non-transitory computer readable medium. Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

Additionally, in order to effectuate communication of data between attached devices, system bus 120 may be connected to one or more bus bridge 132 and bus bridge 152. Bus bridge 132 and bus bridge 152 may be utilized to connect two different computing buses together, such as system bus 120 to PCI bus 130 and system bus 120 to USB 150. Bus bridge 132 and bus bridge 152 allow for the system bus 120 to interface with different types and standards for peripheral components (e.g., input/output (I/O) devices, network interface components, audio sound cards used to input and output audio signals, graphics processing unit(s) (GPU), etc.). Thus, bus bridge 132 connects system bus 120 to PCI bus 130, which may act as another computing bus to connect various PCI standardized components. Thus, PCI bus 130 may support PCI device functions from attached PCI devices. PCI device 140a, PCI device 140b, and PCI device 140c may be connected to PCI bus 130 and may communicate with CPU 110 in order to accomplish device functions of PCI device 140a, PCI device 140b, and PCI device 140c. Similarly, bus bridge 152 may connect to USB 150, where USB 150 may connect to one or more USB devices that support USB standardized device functions.

Attached devices may make up PCI device 140a, PCI device 140b, PCI device 140c, and/or peripheral device 160. Attached devices/components may include an input/output (I/O) component that processes a user action, such as selecting keys from a keypad/keyboard or moving a mouse, selecting one or more buttons, image, or links, and/or moving one or more images, etc., and sends a corresponding signal to system bus 120. An I/O component may also include an output component, such as a display and a cursor control (such as a keyboard, keypad, mouse, etc.). An optional audio input/output component may also be included to allow a user to use voice for inputting information by converting audio signals. Audio I/O component may allow the user to hear audio. A transceiver or network interface may transmit and receive signals between system 100 and other devices, such as another endpoint or server via a network connection. The network connection may be implemented as a single network or a combination of multiple networks. For example, in various embodiments, the network connection may include the Internet or one or more intranets, landline networks, wireless networks, and/or other appropriate types of networks. Thus, the network connection may correspond to small scale communication networks, such as a private or local area network, or a larger scale network, such as a wide area network or the Internet, accessible by system 100.

In various embodiments of the present disclosure, execution of instruction sequences to practice the present disclosure may be performed by system 100. In various other embodiments of the present disclosure, a plurality of computer systems 100 coupled by a communication link to a network (e.g., such as a LAN, WLAN, PTSN, and/or various other wired or wireless networks, including telecommunications, mobile, and cellular phone networks) may perform instruction sequences to practice the present disclosure in coordination with one another.

Figure 2:
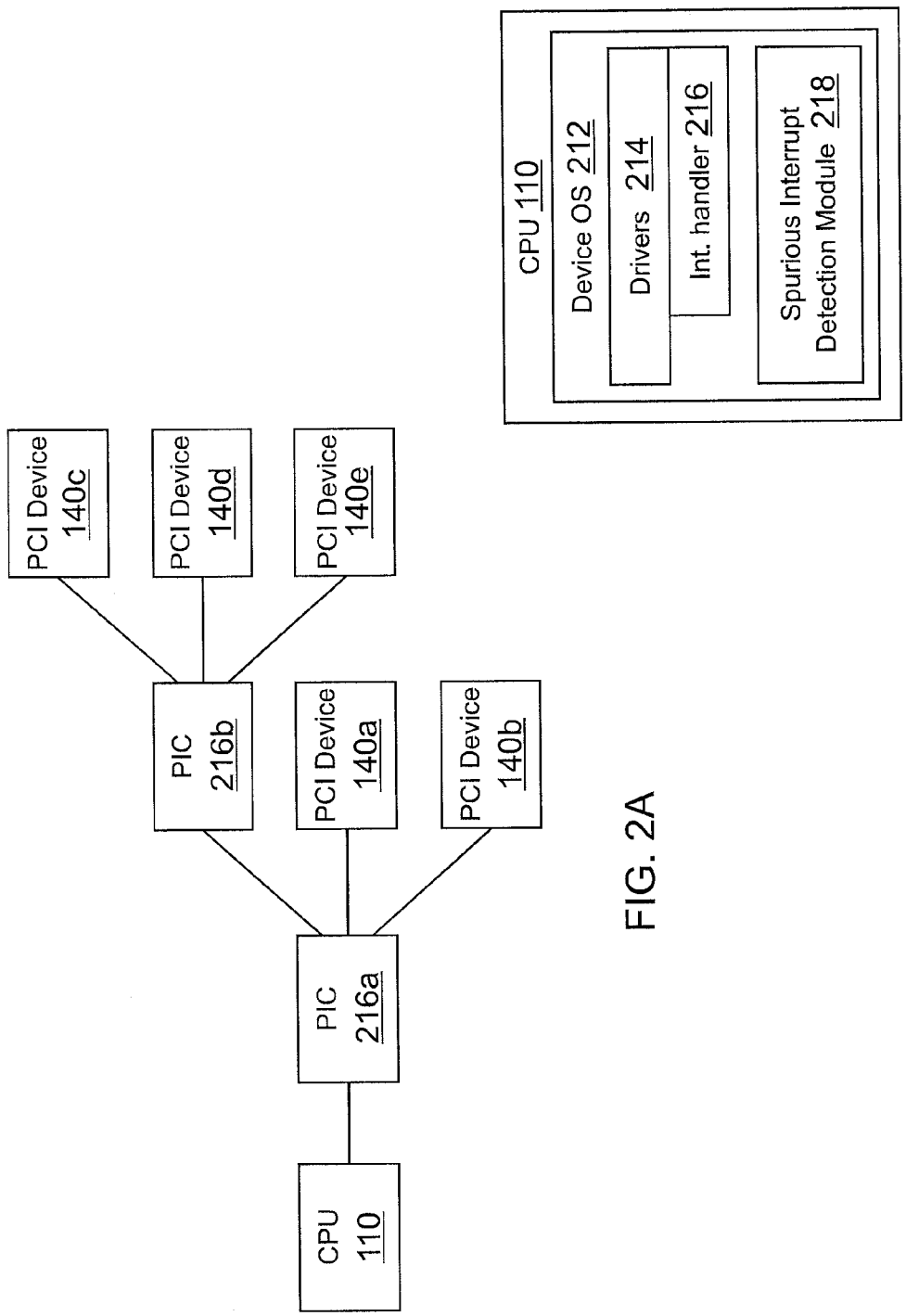
FIG. 2A is a simplified block diagram illustrating a central processing unit (CPU) utilizing a Programmable Interrupt Controller (PIC) to receive interrupt request signals from connected devices, according to an embodiment.
FIG. 2B is a simplified block diagram illustrating a central processing unit (CPU) executing an operating system (OS) that handles interrupt signals received from attached devices of a computer system, according to an embodiment.

FIG. 2A is a simplified block diagram illustrating a central processing unit (CPU) utilizing a Programmable Interrupt Controller (PIC) to receive interrupt request signals from connected devices, according to an embodiment. Although the components of system 100 are shown residing as separately connected devices or components, it is understood each structure may be implemented and/or executed within a single computing system FIG. 2A shows computer architecture of a CPU connected to a PIC via an interrupt line in order to receive an interrupt signal from the PIC and interface with a connected PCI device to provide processing time to a device function of the PCI device. As discussed herein, CPU 110 may be utilized to process an interrupt signal using an interrupt handler for a driver of the attached device generating the interrupt signal. In order to receive the interrupt signal, CPU 110 may include a single connection used to receive the interrupt signal from a PIC 216a. PIC 216a may be utilized in order to provide a plurality of interrupt request lines to devices connected to PIC 216a so that CPU 110 may receive an interrupt signal from a plurality of device functions of the devices connected to PIC 216a. Once PIC 216a asserts an interrupt signal to CPU 110, PIC 216a may further provide information of which device function from the connected devices is asserting the interrupt signal using an IRQ value for device function asserting the interrupt signal.

PIC 216a may further be connected to another PIC 216b (e.g., a cascaded PIC chip), which may provide further interrupt signal lines for additional connected devices of PIC 216b. PIC 216a and PIC 216b are connected to PCI device 140a, PCI device 140b, PCI device 140c, PCI device 140d, and PCI device 140e, which may form a plurality of devices requiring use of an interrupt signal to request processing time from CPU 110. Each connection for PCI device 140a, PCI device 140b, PCI device 140c, PCI device 140d, and PCI device 140e to PIC 216a and/or PIC 216b may correspond to an interrupt channel, which may include the connection's own IRQ value. Additionally, although PCI device 140a, PCI device 140b, PCI device 140c, PCI device 140d, and PCI device 140e are shown as separate devices, PCI devices may share an interrupt such that PCI device 140a, PCI device 140b, PCI device 140c, PCI device 140d, and PCI device 140e may correspond to more than one device having more than one device function. Consequently, PCI devices incorporated at PCI device 140a, PCI device 140b, PCI device 140c, PCI device 140d, and PCI device 140e may share an IRQ value for the connection to PIC 216a and/or PIC 216b.

Thus, when an interrupt signal is normally asserted by a PCI device function of PCI device 140a, PCI device 140b, PCI device 140c, PCI device 140d, and PCI device 140e, an interrupt handler for a driver of the PCI device function of PCI device 140a, PCI device 140b, PCI device 140c, PCI device 140d, and PCI device 140e asserting the interrupt may be invoked by CPU 110 in order to handle the interrupt. However, in the case that PCI device function asserts a spurious hardware interrupt signal from an unwanted or undesirable situation, such as a faulty status resulting from a device or driver error, the interrupt handler for the driver of the PCI device function of PCI device 140a, PCI device 140b, PCI device 140c, PCI device 140d, and PCI device 140e asserting the spurious hardware interrupt signal may not be able to handle or resolve the cause of the spurious hardware interrupt signal. Consequently, the IRQ value for the spurious hardware interrupt signal may continue to assert the spurious hardware interrupt signal and not free the IRQ value so that another PCI device function of PCI device 140a, PCI device 140b, PCI device 140c, PCI device 140d, and PCI device 140e utilizing the IRQ value may not assert further interrupt signals using that IRQ value. Thus, CPU 110 may utilize a spurious interrupt detection module that may determine which device function of PCI device 140a, PCI device 140b, PCI device 140c, PCI device 140d, and PCI device 140e is asserting the spurious hardware interrupt signal, for example, using a spurious interrupt counter of FIG. 2B.

FIG. 2B is a simplified block diagram illustrating a central processing unit (CPU) executing an operating system (OS) that handles interrupt signals received from attached devices of a computer system, according to an embodiment. Although the modules and processes executed by CPU 110 in FIG. 2B are shown residing the in same CPU 100 of FIG. 2B, it is understood each module and/or process may be implemented by separate computer system or processor. For example, a device OS 212 may execute a spurious interrupt detection module 218 for use with another computer system or processor that may generate a spurious hardware interrupt signal.

In FIG. 2B, CPU 110 executes a device OS 212, which may correspond to software executed to manage computer hardware and/or software resources, for example, to provide services for computer programs. Device OS 212 may be utilized to provide execution of applications and/or programs of the computer, and may provide additional functions, such as recognition of tasks performed by attached devices, such as PCI device 140a, PCI device 140b, PCI device 140c, PCI device 140d, and PCI device 140e of FIG. 2A. In this regard, device OS 212 may further include drivers 214, which may be configured to handle input by the attached devices and/or output data to the attached devices for processing. In this regard, drivers 214 may include one or more interrupt handlers 216. Interrupt handlers 216 may handle received interrupts and process the interrupts for device OS 212 to complete the request included in the interrupt. For example, where a device function of one of PCI device 140a, PCI device 140b, PCI device 140c, PCI device 140d, and PCI device 140e of FIG. 2A requests processing time by CPU 110 using an interrupt signal, interrupt handlers 216 may be invoked by device OS 212 in order to handle the interrupt signal and provide processing time to the device function.

However, a spurious interrupt signal may also be generated by a device function of PCI device 140a, PCI device 140b, PCI device 140c, PCI device 140d, and PCI device 140e, for example, caused by a driver bug or a device bug of PCI device 140a, PCI device 140b, PCI device 140c, PCI device 140d, and PCI device 140e. In such embodiments, the spurious interrupt signal may be unexpected and may or may not be able to be resolved. Thus, if the spurious interrupt signal utilizes a IRQ value that another device function of PCI device 140a, PCI device 140b, PCI device 140c, PCI device 140d, and PCI device 140e uses, then the spurious interrupt signal may lock the IRQ value so that the other device functions sharing the IRQ value may be unable to assert further interrupts and may lock the IRQ value, the device functions, and/or the operating system. Thus, device OS 212 may utilize spurious interrupt detection module 218 to determine which device function is asserting the spurious interrupt signal, and whether an interrupt handler for a driver of that device function has resolved the condition causing the spurious interrupt signal or if the device function has stopped asserting the spurious interrupt signal. Spurious interrupt detection module 218 may correspond to specialized hardware and/or software executed by CPU 110 to determine a device function asserting a spurious interrupt signal. Spurious interrupt detection module 218 may determine the device function asserting the spurious interrupt signal by determining the IRQ value for the spurious interrupt signal, determining device functions sharing the IRQ value, and repeatedly scanning those device functions to determine the device function asserting the IRQ value by calling the driver's interrupt handler for each of the device functions to determine if the driver's interrupt handler has processed and handled the interrupt the device function asserted.

Figure 3:
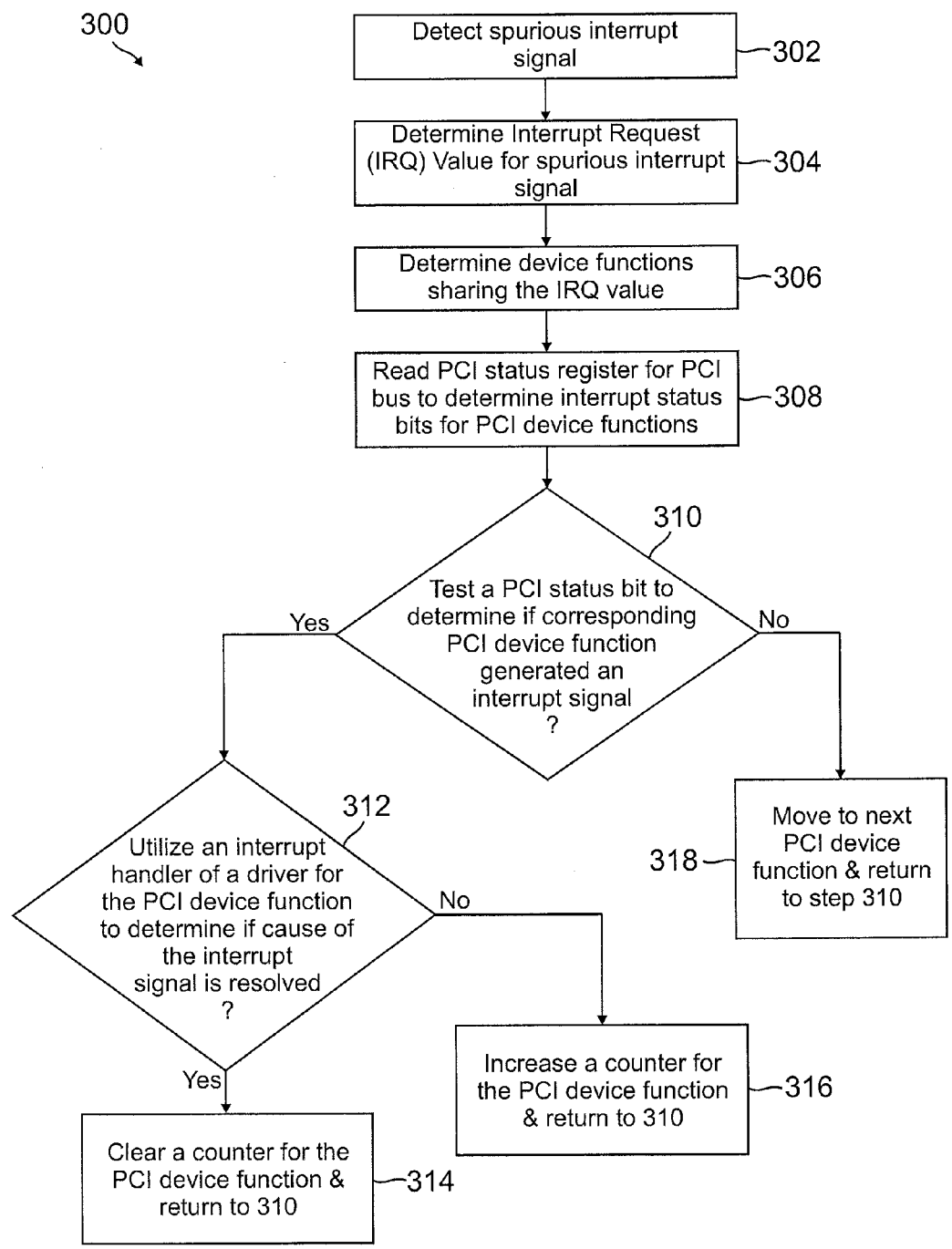
FIG. 3 is a simplified block diagram illustrating an exemplary flowchart of an operating system's execution of a process for detection of device functions asserting a spurious interrupt, according to an embodiment.

FIG. 3 is a simplified block diagram illustrating an exemplary flowchart of an operating system's execution of a process for detection of device functions asserting a spurious interrupt, according to an embodiment. FIG. 3 illustrates a flowchart that a spurious interrupt detection module may utilize to determine whether a device function sharing an IRQ value for a spurious interrupt signal is causing the spurious interrupt signal.

At cell 302, a spurious interrupt signal is detected, such as by an operating system executed by a CPU of a computer, where the operating system may execute a spurious interrupt detection module in order to determine a device function asserting the spurious interrupt signal for resolution of the cause of the spurious interrupt signal. The spurious interrupt signal may be asserted by a PCI device function. The spurious interrupt signal may have resulted in a device or driver bug such that the spurious interrupt signal may not be able to be resolved by a driver of the device utilizing an interrupt handler. Once the spurious interrupt signal is detected, an Interrupt Request (IRQ) value for the spurious interrupt signal may be determined, at cell 304. The IRQ value may be determined from the PIC chip that communicated the interrupt signal to the CPU. The PIC chip may receive the spurious interrupt signal from a connected device, where the spurious interrupt signal is caused by a device function of the connected device. However, multiple device functions (e.g., PCI device functions) may share the IRQ value. Thus, at cell 306, device functions sharing the IRQ value are determined. Again, the PIC chip or other stored data may be utilized to determine the device functions registered to the IRQ value asserting the spurious interrupt signal.

Once the device functions sharing the IRQ value are determined, the spurious interrupt detection module may repeatedly scan all the device functions (e.g., a plurality of PCI device functions) sharing the IRQ value in order to determine the device function (e.g., PCI device function) asserting the spurious interrupt signal. In order to do so, a PCI status register for a PCI bus is read to determine interrupt status bits for PCI device functions sharing the IRQ value, at cell 308. The interrupt status bit may include data allowing the spurious interrupt detection module to determine whether the PCI device function having the corresponding interrupt status bit asserted an interrupt. For example, having a binary 0 in the PCI status register for the interrupt status bit may correspond to data representing that the corresponding device function for that interrupt status bit did not assert an interrupt. Similarly, having a binary 1 may represent that the device function has asserted an interrupt. Thus, at cell 310, the interrupt status bit for each of the PCI device functions sharing the IRQ value is tested to determine if the PCI device function generated an interrupt signal, such as the spurious interrupt signal.

If the PCI status bit acknowledges that the PCI device function generated an interrupt, in order to determine whether the PCI device function is the source of the spurious interrupt signal, the spurious interrupt detection module may utilize an interrupt handler of a driver for the PCI device function asserting the interrupt to determine if the cause of the interrupt signal is resolved, at cell 312. For example, if the interrupt handler has resolved the interrupt and/or if the driver for the device function detects activity, then the spurious interrupt detection module may clear a counter associated with the PCI device function, at cell 314, and return to cell 310 to test the rest of the PCI device functions sharing the IRQ value. However, if the interrupt handler cannot detect or communicate with the device and/or if the interrupt handler cannot resolve the interrupt and determines the interrupt is still being asserted, the counter associated with the PCI device function is increased, at cell 316, and the spurious interrupt detection module returns to cell 310 to test the rest of the PCI device functions. However, if at cell 310 the interrupt status bit for a PCI device function did not generate an interrupt signal (e.g., has a 0 in the PCI status register), the spurious interrupt detection module may move to the next PCI device function and return to cell 310, at cell 318. The spurious interrupt detection module may repeat cells 310-318 a plurality of times so that the counter for each PCI device functions is manipulated more than once. Thus, if the counter for a PCI device function is over a threshold number of times, the spurious interrupt detection module may determine that PCI device function generated the spurious interrupt signal. The spurious interrupt detection module may then alert a system administrator of the PCI device function, may eject the associated PCI device, or may reset the associated PCI device.

Figure 4:
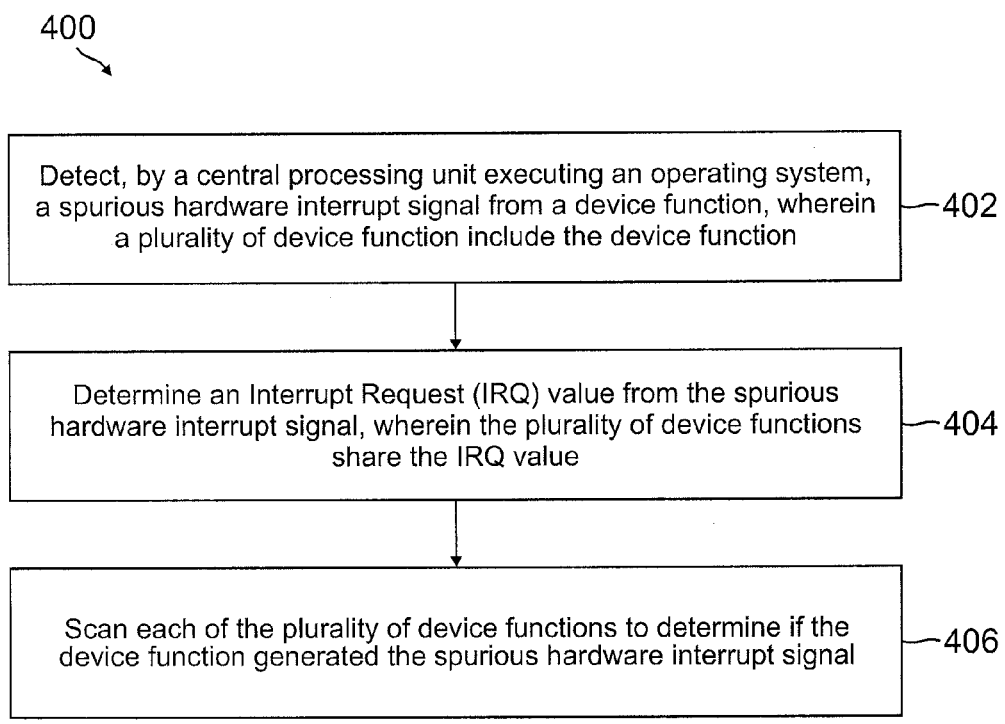
FIG. 4 is a simplified block diagram illustrating an exemplary method for detection of device functions asserting a spurious interrupt, according to an embodiment.

FIG. 4 is a simplified block diagram illustrating an exemplary method for detection of device functions asserting a spurious interrupt, according to an embodiment. Note that one or more steps, processes, and methods described herein may be omitted, performed in a different sequence, or combined as desired or appropriate.

At step 402, a spurious hardware interrupt signal is detected from a device function, by a central processing unit executing an operating system, wherein a plurality of device functions includes the device function. The device function may comprise a Peripheral Component Interconnect (PCI) device function from a PCI bus. Thus, the plurality of device functions may comprise at least one additional PCI device function from the PCI bus.

At step 404, an Interrupt Request (IRQ) value is determined from the spurious hardware interrupt signal, wherein the plurality of device functions shares the IRQ value. Thus, at step 406, each of the plurality of device functions is scanned to determine the device function generated the spurious hardware interrupt signal. Scanning each of the plurality of device functions may comprise reading a PCI status register for the PCI bus to determine an interrupt status bit for the PCI device and testing the interrupt status bit for the PCI device function to determine whether the PCI device function generated an interrupt signal.

In response to determining the PCI device function generated the interrupt signal, an interrupt handler for a driver of the PCI device function may be utilized to determine whether the PCI device function is generating the spurious hardware interrupt signal, wherein the PCI device function is generating the spurious hardware interrupt signal if the interrupt handler does not detect device function activity for the PCI device function or detects that the spurious hardware interrupt signal is not cleared for the PCI device, and wherein the PCI device function is not generating the spurious hardware interrupt signal if the interrupt handler detects device function activity for the PCI device function or detects that the driver handles the spurious hardware interrupt signal. Moreover, a first spurious interrupt counter may be increased if the PCI device function is generating the spurious hardware interrupt signal or the first spurious interrupt counter may be cleared if the PCI device function is not generating the spurious hardware interrupt signal. Utilizing the interrupt handler may be performed a plurality of times so that the PCI device function may be marked as the source of the spurious hardware interrupt signal if the first spurious interrupt counter exceeds a threshold. In response to marking the PCI device function as the source of the spurious hardware interrupt signal, at least one of a system administrator is notified, the PCI device function is ejected, and the PCI device function is reset.

Where the interrupt status bit of the PCI device function does not include information recognizing the PCI device function as generating an interrupt or where the interrupt handler of the driver for the PCI device function was utilized to determine if the PCI device function resolved or did not resolve a generated interrupt, the method may continue to test the at least one additional PCI device function. Thus, the method may further comprise reading the PCI status register for the PCI bus to determine at least one additional interrupt status bit for the at least one additional PCI device, testing the at least one additional interrupt status bit for the at least one additional PCI device function to determine whether the at least one additional PCI device function is generating another interrupt signal, and in response to determining the at least one additional PCI device function generated the other interrupt signal utilizing at least one additional interrupt handler for at least one additional driver of the at least one additional PCI device function to determine whether the at least one additional PCI device function is generating the spurious hardware interrupt signal, wherein the at least one additional PCI device function is generating the spurious hardware interrupt signal if the at least one additional interrupt handler does not detect device function activity for the at least one additional PCI device function or detects that the spurious hardware interrupt signal is not cleared for the at least one additional PCI device, wherein the at least one additional PCI device function is not generating the spurious hardware interrupt signal if the at least one additional interrupt handler detects device function activity for the at least one additional PCI device function or detects that the at least one additional driver handles the spurious hardware interrupt signal, and wherein the utilizing the at least one additional interrupt handler is performed the plurality of times. A second spurious interrupt counter may be increased if the at least one additional PCI device function is generating the spurious hardware interrupt signal or the first second spurious interrupt counter may be cleared if the at least one additional PCI device function is not generating the spurious hardware interrupt signal, wherein the at least one additional PCI device function is marked as the source of the spurious hardware interrupt signal if the first second exceeds a threshold.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:
1. A method comprising:
 detecting, by a central processing unit executing an operating system, a spurious hardware interrupt signal from a PCI device function from a PCI bus, wherein a plurality of device functions includes the PCI device function, and wherein the plurality of device functions comprise at least one additional PCI device function from the PCI bus;

determining an Interrupt Request (IRQ) value from the spurious hardware interrupt signal, wherein the plurality of device functions shares the IRQ value;

reading a PCI status register for the PCI bus to determine an interrupt status bit for the PCI device;

testing the interrupt status bit for the PCI device function to determine whether the PCI device function generated a first interrupt signal; and in response to determining the PCI device function generated the first interrupt signal, utilizing an interrupt handler for a driver of the PCI device function to determine whether the PCI device function is generating the spurious hardware interrupt signal, wherein the PCI device function is generating the spurious hardware interrupt signal if the interrupt handler does not detect device function activity for the PCI device function or detects that the spurious hardware interrupt signal is not cleared for the PCI device, and wherein the PCI device function is not generating the spurious hardware interrupt signal if the interrupt handler detects device function activity for the PCI device function or detects that the driver handled the spurious hardware interrupt signal.

2. The method of claim 1 further comprising:
increasing a first spurious interrupt counter if the PCI device function is generating the spurious hardware interrupt signal.

3. The method of claim 2 further comprising:
clearing the first spurious interrupt counter if the PCI device function is not generating the spurious hardware interrupt signal.

4. The method of claim 3, wherein the utilizing the interrupt handler is performed a plurality of times.

5. The method of claim 4, wherein the PCI device function is marked as the source of the spurious hardware interrupt signal if the first spurious interrupt counter exceeds a threshold.

6. The method of claim 5, wherein in response to marking the PCI device function as the source of the spurious hardware interrupt signal, at least one of a system administrator is notified, the PCI device function is ejected, and the PCI device function is reset.

7. The method of claim 1 further comprising:
reading the PCI status register for the PCI bus to determine at least one additional interrupt status bit for the at least one additional PCI device;

testing the at least one additional interrupt status bit for the at least one additional PCI device function to determine whether the at least one additional PCI device function generated a second interrupt signal;

in response to determining the at least one additional PCI device function generated the second interrupt signal, utilizing at least one additional interrupt handler for at least one additional driver of the at least one additional PCI device function to determine whether the at least one additional PCI device function is generating the spurious hardware interrupt signal, wherein the at least one additional PCI device function is generating the spurious hardware interrupt signal if the at least one additional interrupt handler does not detect device function activity for the at least one additional PCI device function or detects that the spurious hardware interrupt signal is not cleared for the at least one additional PCI device, wherein the at least one additional PCI device function is not generating the spurious hardware interrupt signal if the at least one additional interrupt handler detects device function activity for the at least one additional PCI device function or detects that the at least one additional driver handles the spurious hardware interrupt signal, and wherein the utilizing the at least one additional interrupt handler is performed the plurality of times;

increasing a second spurious interrupt counter if the at least one additional PCI device function is generating the spurious hardware interrupt signal; and clearing the first second spurious interrupt counter if the at least one additional PCI device function is not generating the spurious hardware interrupt signal, wherein the at least one additional PCI device function is marked as the source of the spurious hardware interrupt signal if the first second exceeds a threshold.

8. The method of claim 1, wherein the PCI device function is asserted by one of a mouse, a keyboard, a visual input unit, a visual output unit, an audio input unit, an audio output unit, or a network connection transceiver.

9. The method of claim 1, wherein the PCI status bit for the PCI status register provides a first binary number if the PCI device function generated the interrupt signal and a second binary number if the PCI device function did not generate the interrupt signal, and wherein the PCI device function is determined to have generated the interrupt signal if the PCI status bit returns the first binary number in response to the testing the interrupt status bit.

10. A system comprising:
a device operating system module executed by at least one hardware processor that processes at least one device driver module having an interrupt handler; and a spurious interrupt detection module that detects a spurious hardware interrupt signal from a PCI device function from a PCI bus, wherein a plurality of device functions includes the PCI device function, and wherein the plurality of device functions comprise at least one additional PCI device function from the PCI bus, determines an Interrupt Request (IRQ) value from the spurious hardware interrupt signal, wherein the plurality of device functions shares the IRQ value, reads a PCI status register for the PCI bus to determine an interrupt status bit for the PCI device tests the interrupt status bit for the PCI device function to determine whether the PCI device function generated an interrupt signal, and in response to the spurious interrupt detection module determining that the PCI device function generated the interrupt signal when testing the interrupt status bit the each of the plurality of devices, utilizes an interrupt handler for a driver of the PCI device function to determine whether the PCI device function is generating the spurious hardware interrupt signal, wherein the PCI device function is generating the spurious hardware interrupt signal if the interrupt handler does not detect device function activity for the PCI device function or detects that the spurious hardware interrupt signal is not cleared for the PCI device, and wherein the PCI device function is not generating the spurious hardware interrupt signal if the interrupt handler detects device function activity for the PCI device function or detects that the driver handles the spurious hardware interrupt signal.

11. The system of claim 10, wherein the spurious interrupt detection module further increases a first spurious interrupt counter if the PCI device function is generating the spurious hardware interrupt signal.

12. The system of claim 11, wherein the spurious interrupt detection module further clears the first spurious interrupt counter if the PCI device function is not generating the spurious hardware interrupt signal.

13. The system of claim 12, wherein the PCI device function is marked as the source of the spurious hardware interrupt signal if the first spurious interrupt counter exceeds a threshold.

14. The system of claim 13, wherein in response to marking the PCI device function as the source of the spurious hardware interrupt signal, at least one of a system administrator is notified, the PCI device function is ejected, and the PCI device function is reset.

15. The system of claim 10, wherein the PCI device function is asserted by one of a mouse, a keyboard, a visual input unit, a visual output unit, an audio input unit, an audio output unit, or a network connection transceiver.

16. The system of claim 10, wherein the PCI status bit for the PCI status register provides a first binary number if the PCI device function generated the interrupt signal and a second binary number if the PCI device function did not generate the interrupt signal, and wherein the PCI device function is determined to have generated the interrupt signal if the PCI status bit returns the first binary number in response to the testing the interrupt status bit by the spurious interrupt detection module.

17. A non-transitory machine-readable medium comprising a plurality of machine-readable instructions which when executed by one or more processors of an application server are adapted to cause the application server to perform a method comprising:
    detecting, by a central processing unit executing an operating system, a spurious hardware interrupt signal from a device function, wherein a plurality of device functions includes the device function;
    determining an Interrupt Request (IRQ) value from the spurious hardware interrupt signal, wherein the plurality of device functions shares the IRQ value;
    reading a PCI status register for the PCI bus to determine an interrupt status bit for the PCI device;
    testing the interrupt status bit for the PCI device function to determine whether the PCI device function generated an interrupt signal;
    in response to determining the PCI device function generated the interrupt signal, utilizing an interrupt handler for a driver of the PCI device function to determine whether the PCI device function is generating the spurious hardware interrupt signal, wherein the PCI device function is generating the spurious hardware interrupt signal if the interrupt handler does not detect device function activity for the PCI device function or detects that the spurious hardware interrupt signal is not cleared for the PCI device, and wherein the PCI device function is not generating the spurious hardware interrupt signal if the interrupt handler detects device function activity for the PCI device function or detects that the driver handles the spurious hardware interrupt signal;
    increasing a first spurious interrupt counter if the PCI device function is generating the spurious hardware interrupt signal; and
    clearing the first spurious interrupt counter if the PCI device function is not generating the spurious hardware interrupt signal.

18. The non-transitory machine-readable medium of claim 17, wherein the PCI device function is asserted by one of a mouse, a keyboard, a visual input unit, a visual output unit, an audio input unit, an audio output unit, or a network connection transceiver.

19. The non-transitory machine-readable medium of claim 17, wherein the PCI status bit for the PCI status register provides a first binary number if the PCI device function generated the interrupt signal and a second binary number if the PCI device function did not generate the interrupt signal, and wherein the PCI device function is determined to have generated the interrupt signal if the PCI status bit returns the first binary number in response to the testing the interrupt status bit.

20. The non-transitory machine-readable medium of claim 17, wherein the PCI device function is marked as the source of the spurious hardware interrupt signal if the first spurious interrupt counter exceeds a threshold and in response to marking the PCI device function as the source of the spurious hardware interrupt signal, at least one of a system administrator is notified, the PCI device function is ejected, and the PCI device function is reset.

* * * * *